US008168346B2

(12) United States Patent
Kushibiki et al.

(10) Patent No.: US 8,168,346 B2
(45) Date of Patent: May 1, 2012

(54) FUEL CELL STACK STRUCTURE

(75) Inventors: Keiko Kushibiki, Fujisawa (JP);
Yasushi Nakajima, Kawasaki (JP);
Shigeo Ibuka, Ebina (JP); Hirokazu Komatsu, Yokohama (JP); Tatsuya Yaguchi, Yokosuka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 984 days.

(21) Appl. No.: 12/089,768

(22) PCT Filed: Oct. 26, 2006

(86) PCT No.: PCT/JP2006/321327
§ 371 (c)(1),
(2), (4) Date: Apr. 10, 2008

(87) PCT Pub. No.: WO2007/049671
PCT Pub. Date: May 3, 2007

(65) Prior Publication Data
US 2009/0233141 A1  Sep. 17, 2009

(30) Foreign Application Priority Data

Oct. 28, 2005 (JP) ................................. 2005-314932
Sep. 28, 2006 (JP) ................................. 2006-264443

(51) Int. Cl.
*H01M 8/24* (2006.01)
*H01M 2/08* (2006.01)

(52) U.S. Cl. ........ 429/466; 429/460; 429/467; 429/469; 429/508; 429/511

(58) Field of Classification Search .................. 429/466, 429/467, 469, 508, 511, 458, 460
See application file for complete search history.

(56) References Cited

U.S. PATENT DOCUMENTS

| 6,344,290 | B1 | 2/2002 | Bossel |
| 6,773,843 | B2 | 8/2004 | Kitagawa et al. |
| 7,049,019 | B2 * | 5/2006 | Tsunoda ........................ 429/454 |
| 2002/0127453 | A1 | 9/2002 | Kitagawa et al. |
| 2004/0234836 | A1 | 11/2004 | Orishima et al. |
| 2005/0142423 | A1 | 6/2005 | Homma et al. |

FOREIGN PATENT DOCUMENTS

| JP | 05-047409 A | 2/1993 |
| JP | 2002-151106 A | 5/2002 |
| JP | 2002-270212 A | 9/2002 |
| JP | 2004-227848 A | 8/2004 |
| JP | 2005-209622 A | 8/2005 |
| JP | 2005-353421 A | 12/2005 |
| JP | 2006-172964 A | 6/2006 |
| WO | WO 03/012903 A1 | 2/2003 |
| WO | WO 2005122314 | * 12/2005 |

* cited by examiner

*Primary Examiner* — Ula C. Ruddock
*Assistant Examiner* — Thomas H. Parsons
(74) *Attorney, Agent, or Firm* — Foley & Lardner LLP

(57) ABSTRACT

Solid oxide fuel cells each include a circular cell plate holding single cells as a solid oxide fuel cells and having a gas introducing opening and a gas exhausting opening in a central section. A circular separator plate has a gas introducing opening and a gas exhausting opening in a central section. Sealing members allow the gas intruding openings of the cell plate and the separator plate to airtightly communicate with each other and allow the gas exhausting openings of the cell plate and the separator plate to airtightly communicate with each other.

10 Claims, 7 Drawing Sheets

FIG. 2
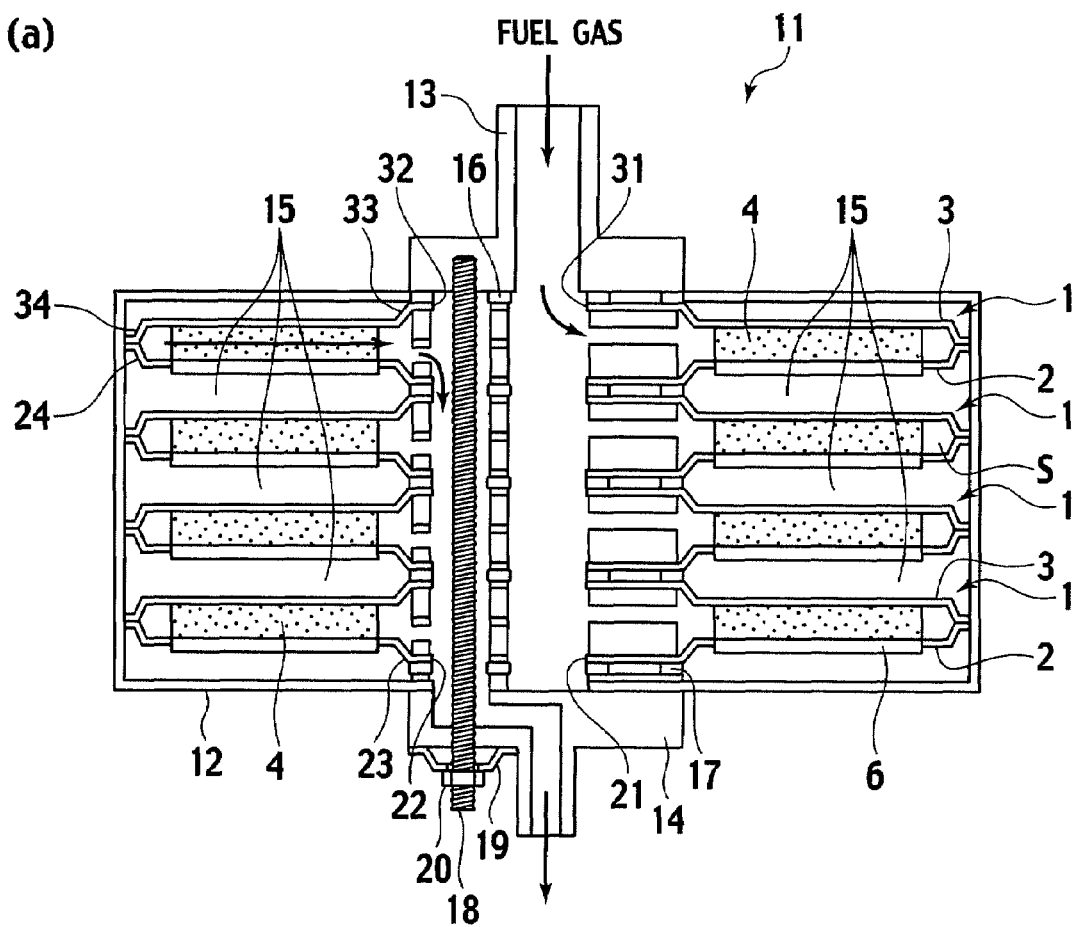
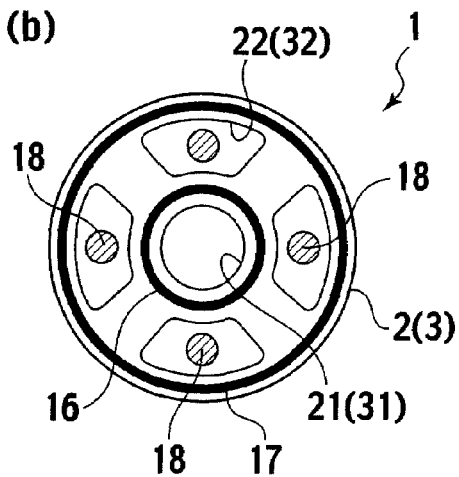
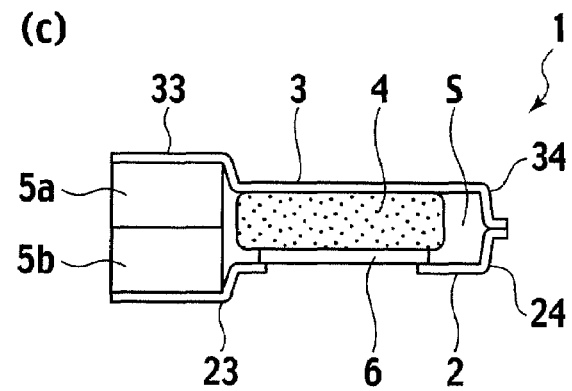

FIG. 8
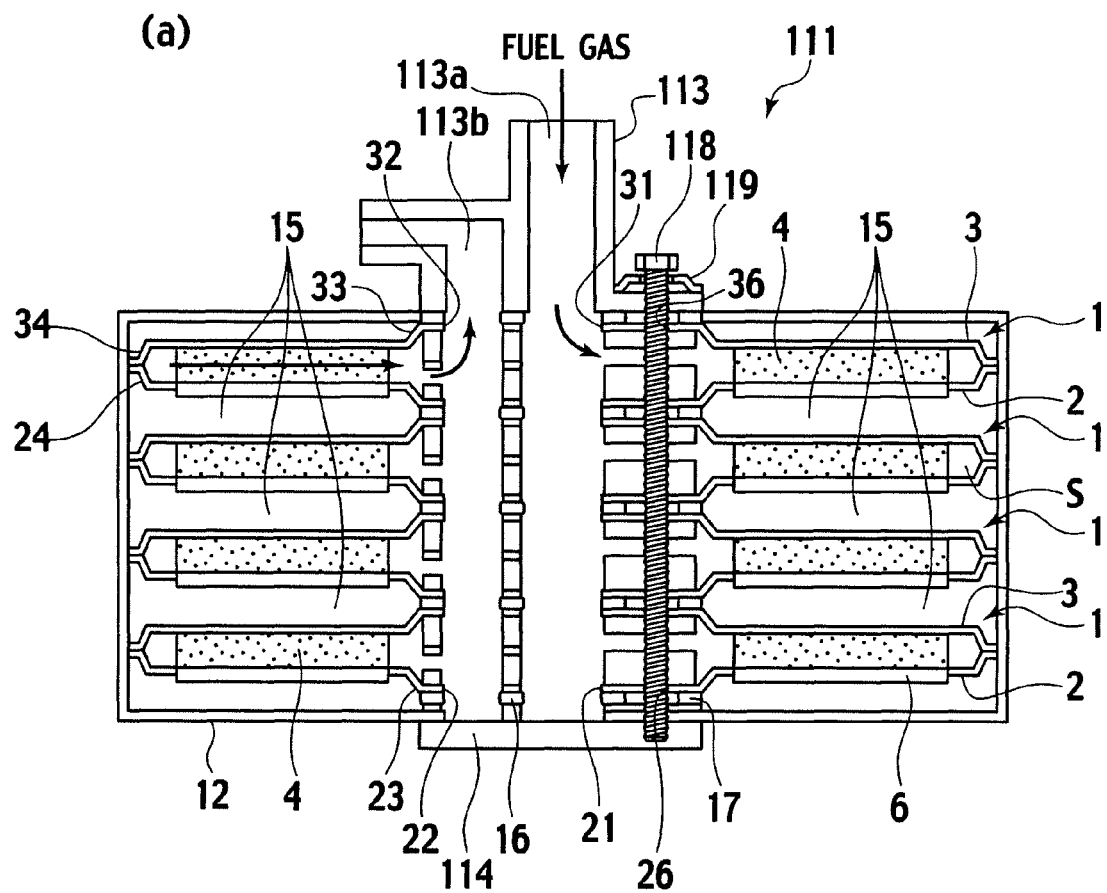
(a)
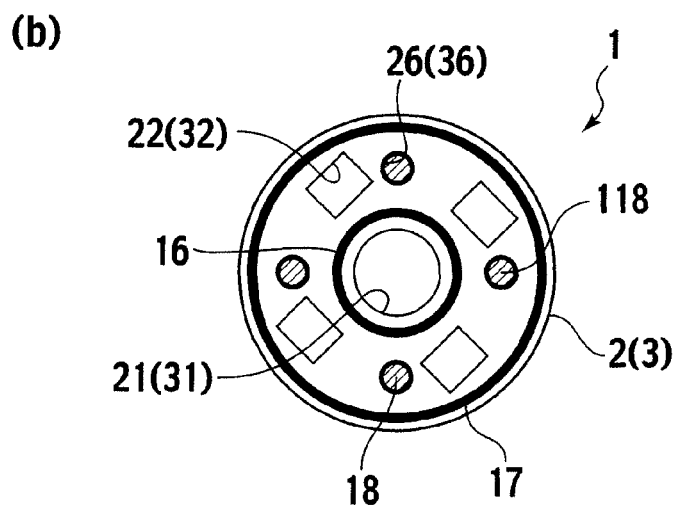
(b)

FIG. 9
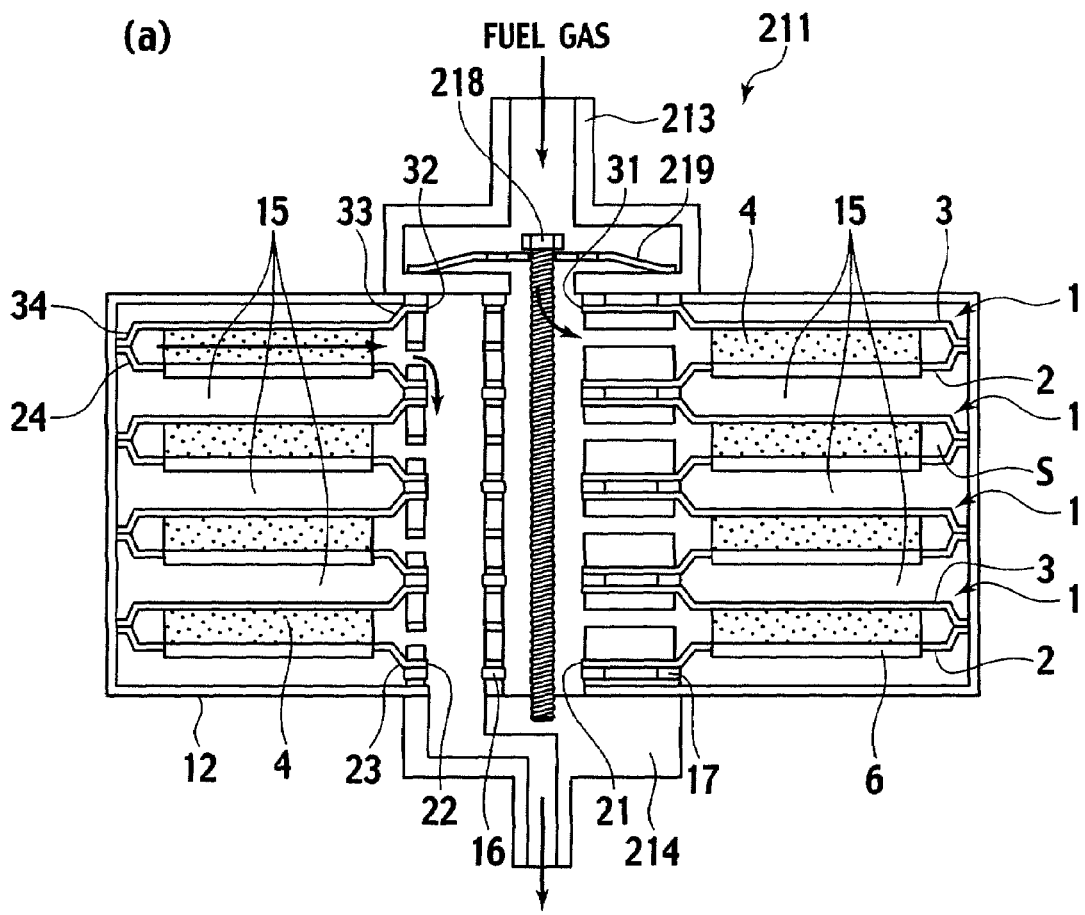
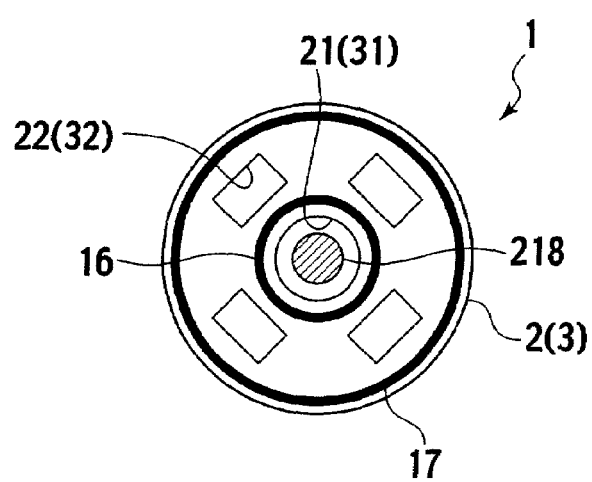

FUEL CELL STACK STRUCTURE

This is a 371 national phase application of PCT/JP2006/321327, filed Oct. 26, 2006, which claims priority to Japanese Patent Application No. JP 2005-314932, filed Oct. 28, 2005, and Japanese Patent Application No. JP 2006-264443, filed Sep. 28, 2006.

TECHNICAL FIELD

The present invention relates to a fuel cell stack structure composed of a plurality of solid oxide fuel cells stacked.

BACKGROUND ART

Conventional fuel cell stack structures each composed of a plurality of solid oxide fuel cells stacked are disclosed by U.S. Pat. No. 6,344,290 and Japanese Patent Unexamined Publication No. 2002-151106.

DISCLOSURE OF INVENTION

In the case of the fuel cell stack structure of U.S. Pat. No. 6,344,290, both gases of fuel gas and air are supplied through central sections of cell plates and separator plates and exhausted through outer peripheries, and thus unburned gas cannot be recovered. Accordingly, in the case where the gas flow varies, such as at transient operation, the fuel utilization is reduced, and the power generation efficiency is reduced. Furthermore, in such a case, unstable combustion in the outer periphery causes local thermal stress in single cells, and the single cells could be damaged.

Moreover, the above stack structure is composed of a cell plate and a separator plate alternately stacked on each other. Sealing members for fuel gas introducing openings and sealing members for air introducing openings are individually arranged alternately between adjacent pairs of the cell plate and the separator plate. Accordingly, pressure to fix the cell plate and the separator plate stacked by bolts on one another cannot be equally transmitted.

Furthermore, in the above stack structure, for the purposes of improving startability and responsibility at the transient operation and reducing energy required for heating at the start to increase a total efficiency of operations including start and stop, or for the purpose of increasing stacking density of the stack to increase output density, the central sections of the cell plate and the separator plate are made thin in some cases to reduce heat capacity. However, the stack structure could be subject to creep deformation due to thermal stress caused by a difference in coefficient of thermal expansion between the central sections of the cell plate and the separator plate and the sealing members when the stack structure repeatedly increases and decreases in temperature. Accordingly, the gas sealability is reduced, or defects such as cracks occur in the single cells, thus reducing the durability and resistance to heat shock.

In the above stack structure, both fuel gas and air are supplied through the central sections of the cell plate and the separator plate. Accordingly, the fuel gas and air introducing openings need to have circular shapes which are most suitable to keep the gas-tightness, and moreover the fuel and air introducing openings need to be individually sealed. Accordingly, the proportion of an area occupied by the central section to that of each cell plate becomes large, and the effective power generation area of the cell plate becomes small. Moreover, the sealing members are provided for long distance.

On the other hand, in the case of the fuel cell stack structure of Japanese Patent Unexamined Publication No. 2002-151106, each fuel cell has a bag structure, so that unburned gas can be recovered. In this stack structure, a plurality of fuel cells each composed of a circular cell plate and an annular separator plate are fixed by bolts which are arranged in the outer peripheries and extended in the axial direction. It is therefore difficult to equally fasten around the central channel members of the fuel cells requiring gas seal. Especially under operational conditions where the temperature is repeatedly raised and lowered frequently, the cell plate and the separator plate, which are thin plate shaped, bend, thus degrading fastening characteristics.

As to be described in detail, in the above stack structure composed of the plurality of fuel cells stacked, it is very important whether the gas sealing performance is good around the central channel members of the fuel cells. However, since the bolts fixing the plurality of fuel cells stacked are arranged in the outer peripheries, it is difficult to equally fasten the bolts when there are a lot of layers of the stacked fuel cells. Especially when the cell plate and the separator plate constituting the fuel cells are thin plate-shaped, each of the fuel cells is not well fastened around the central channel members even if bolting is performed on the outer peripheral side off the center of the fuel cell. Under operational conditions where the temperature is repeatedly raised and lowered, in such a stack structure having an outer peripheral fastening structure, the cell plate and the separator plate are bent because of thermal expansion caused by the rise and fall of temperature, thus leading to degradation in fastening characteristics.

The present invention was made in the light of the problems of the conventional art, and an object thereof is to provide a fuel cell stack structure in which unburned fuel can be recovered and the gas sealability is hardly deteriorated to provide high reliability even under conditions where the stack temperature frequently varies such as at the start and stop, the transient operation, or the like. Another object of the present invention is to provide a fuel cell stack structure in which the heat shock resistance can be increased while the cell plate and the separator plate are reduced in thickness for low heat capacity and moreover the output density can be increased.

A fuel cell stack structure according to an aspect of the present invention includes: a plurality of solid oxide fuel cells, each of the solid oxide fuel cells including: a circular cell plate holding a single cell and having a gas introducing opening and a gas exhausting opening in central section thereof; a circular separator plate having the gas introducing opening and the gas exhausting opening in central section thereof and having an entire outer peripheral edge joined to an outer peripheral edge of the cell plate; and a central channel member which is located between the central sections of the cell plate and the separator plate to allow the gas introducing openings of the cell plate and the separator plate to communicate with each other and to allow the gas exhausting openings of the cell plate and the separator plate to communicate with each other, and supplies and exhausts any one of fuel gas and air to and from a space formed between the cell plate and the separator plate, the space being formed by providing at least any one of the cell plate and the separator plate with a step along the outer peripheral edge thereof; sealing members interposed between each adjacent pair of the central sections of the stacked solid oxide fuel cells, the sealing members allowing the gas introducing openings opposite to each other to airtightly communicate with each other and allowing the gas exhausting openings opposite to each other to airtightly communicate with each other; and a bolt penetrating through the central sections of the stacked solid oxide fuel cells, wherein a plurality of the solid oxide fuel cells are stacked facing a same direction, an interspace between each adjacent pair of the solid oxide fuel cells serves as a channel for only the other one of fuel gas and air, and the solid oxide fuel cells stacked with the sealing members interposed therebetween are fastened and fixed by the bolt.

BRIEF DESCRIPTION OF DRAWINGS

FIG. 2 shows the fuel cell stack structure of FIG. 1: (a) being a cross-sectional view taken along a line A-A of FIG. 1; (b) being a transverse cross sectional view at the center of one of solid oxide fuel cells constituting the fuel cell stack structure; and (c) being a partial longitudinal cross-sectional view at the center of the solid oxide fuel cell constituting the fuel cell stack structure.

FIG. 8 shows another embodiment of the fuel cell stack structure of the present invention, (a) being a cross-sectional view taken along a line A-A of FIG. 1; (b) being a transverse cross-sectional view of central section of the solid oxide fuel cell constituting the fuel cell stack structure.

FIG. 9 shows still another embodiment of the fuel cell stack structure of the present invention, (a) being a cross-sectional view taken along a line A-A of FIG. 1; and (b) being a transverse cross-sectional view of central section of one of the solid oxide fuel cells constituting the fuel cell stack structure.

BEST MODE FOR CARRYING OUT THE INVENTION

Figure 1:
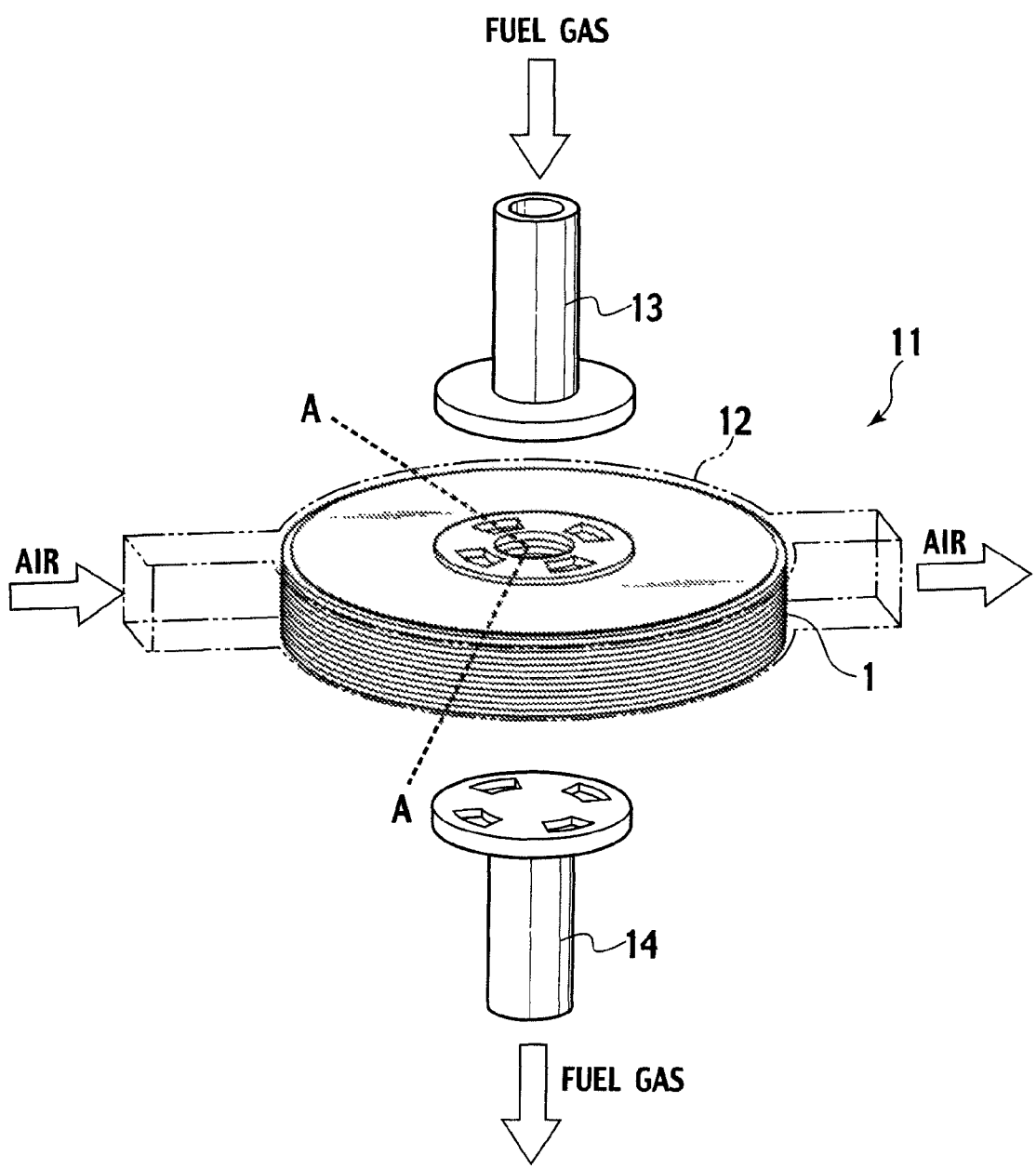
FIG. 1 is a perspective view showing an embodiment of a fuel cell stack structure of the present invention.

A fuel cell stack structure (hereinafter, also referred to as just a stack structure) of the present invention is composed of a plurality of solid oxide fuel cells (hereinafter, also referred to as just fuel cells) which are stacked facing a same direction. Each of the fuel cells includes a separator plate and a cell plate joined to each other. The cell plate is circular, holds single cells, and has a gas introducing opening and a gas exhausting opening in a central section thereof. The separator plate is circular and has a gas introducing opening and a gas exhausting opening in a central section thereof. An outer peripheral edge of the separator plate is joined to an outer peripheral edge of the cell plate.

Furthermore, at least one of the cell plate and the separator plate includes a step along the outer peripheral edge thereof, and the step forms a space between the cell plate and the separator plate.

In between the central sections of the cell plate and the separator plate, central channel members are arranged which communicate with the gas introducing openings and the gas exhausting openings of the cell plate and the separator plate and supply and exhaust one of unburned fuel gas and air to and from the space between the cell plate and the separator plate.

In the stack structure of the present invention, interspaces between the fuel cells stacked on each other are used as channels of the other one of fuel gas and air. Furthermore, in the stack structure, sealing members are provided between the central sections of each adjacent pair of the fuel cells and allow the gas introducing openings opposite to each other and the gas exhausting openings opposite to each other to airtightly communicate with each other. In the stack structure, the plurality of fuel cells stacked are fastened and fixed by a bolt penetrating the central sections of the fuel cells.

In the stack structure of the present invention, only one of fuel gas and air is allowed to flow through the space formed between the cell plate and the separator plate of each of the fuel cells. Accordingly, unburned gas is not mixed with air and can be recovered. Even in the case where gas flow changes such as at the transient operation, the fuel utilization is not reduced, and moreover, it is less likely to cause disadvantages due to thermal stress locally applied to the single cells.

Moreover, a sealing member allowing the gas introducing openings of each fuel cell to airtightly communicate with each other and a sealing member allowing the gas exhausting openings to airtightly communicate with each other are both provided between the central sections of the fuel cells adjacent to each other. Accordingly, pressing force to fasten and fix the fuel cells stacked on each other with bolts penetrating the central sections of the fuel cells can be transmitted equally to each central section of the fuel cells. This can prevent creep deformation from being easily caused by rise and fall of temperature thus increasing the durability and resistance to heat shock even if the center parts of the cell plate and the separator plate are reduced in wall thickness for reduction of heat capacity. Even if the central sections of the cell plate and the separator plate are reduced in thickness for lower heat capacity, it becomes less likely to cause creep deformation at rise and fall of temperature, thus increasing the durability and the heat shock resistance.

Furthermore, it is possible to employ a structure in which sealing members are not individually arranged around each of the gas introducing opening and the gas exhausting opening. Accordingly, installation areas and installation lengths of the sealing members can be made small. Accordingly, the gas sealability is hardly deteriorated even under the conditions where stack temperature frequently varies at the start and stop, the transient operation, and the like. In addition, since the shape of the gas exhausting opening is less limited, dead space in the central section is made small accordingly. In other words, the proportion of an area occupied by the central section in the entire of each cell plate is small. Accordingly, the effective power generation area is expanded, and the output density is increased.

In the fuel cells of the stack structure of the present invention, the outer peripheral edges of each metallic cell plate and each metallic separator plate are joined, and at least one of the cell plate and the separator plate includes a step along the outer peripheral edge. This allows a bag-shaped space to be formed between the cell plate and the separator plate, and only one of fuel gas and air flows through this space.

In the stack structure of the present invention, a part of each fuel cell where the central channel members are provided is made thicker than that of an area of the fuel cell where the single cells are attached. A spacer providing the interspace between each adjacent pair of the fuel cells is thereby formed. Accordingly, between each adjacent pair of the stacked fuel cells, a channel allowing the other one of fuel gas and air to flow therethrough is formed.

The stack structure composed of the stacked fuel cells having the bag structure is less likely to leak gas even when the stack structure is exposed to an external shock in a vehicle.

Moreover, if such steps are formed in both of the cell plate and the separator plate so as to be symmetrical to each other, stress concentration can be suppressed. At this time, even if the steps of the cell plate and the separator plate are made different in size from each other, it can be expected to increase in strength of the fuel cells by the provision of the steps. Moreover, when such steps are formed in any one of the cell plate and the separator plate, the area where the single cells are mounted can be increased. In such a manner, the cell plate and the separator plate can be changed in shape according to properties given priorities, such as increases in heat shock resistance and output density.

Furthermore, the steps are desirably formed by pressing. Moreover, the outer peripheral edges of the cell plate and the separator plate may be joined using, in addition to welding and brazing, ultrasonic joining and the like.

In the stack structure of the present invention, the attachment positions of the single cells in each fuel cell are set in a doughnut-shaped region of the cell plate thereof between the central section and outer peripheral edge. In the doughnut-shaped region, at least one single cell can be fixed. For example, single cells having a disk shape with a small diameter are desirably arranged regularly around the center of each cell plate. Moreover, when the single cells have a doughnut shape, it is desirable that outer and inner rings already pressed are joined to the inner and outer peripheral edges of the single cells, respectively. Furthermore, the inner and outer rings may be linked to form a frame, and fan shaped single cells can be attached to the frame.

In the stack structure of the present invention, the sealing member arranged between the central sections of the fuel cells stacked on each other can be made of an inorganic bonding material having a function to bond adjacent fuel cells, such as electrically insulating ceramic adhesives and glass bonding materials. In addition, for example, when the single cells are doughnut-shaped, the sealing member can be made of an electrically-conductive bonding material containing a mixture of a brazing material and metallic powder.

To join the adjacent fuel cells to each other by the sealing member, first, paste of the sealing member containing the aforementioned materials is applied to the central sections of the fuel cells, and these fuel cells are stacked on each other, followed by pressure heating. Moreover, the sealing member can be fiber-shaped, thin plate-shaped, or ribbon-shaped. The sealing member can also be a sealing member molded into a gasket containing grains or powder of the aforementioned materials. The fuel cells can be joined by stacking on each other the fuel cells with the ribbon-shaped or gasket-shaped sealing member being placed between the central sections of the fuel cells for pressure heating.

Furthermore, the fuel cells can be joined by: forming a film of the aforementioned materials in a bond composition with a desired pattern on the central sections of the fuel cells by vapor deposition, sputtering, thermal spraying, and aerosol deposition; stacking the fuel cells on each other; and then performing pressure heating. Furthermore, sealing can be achieved by placing the sealing member between the central sections of each adjacent pair of fuel cells; and pressing the fuel cells at such a temperature that the sealing member can soften so as to fill uneven gap between the central sections.

In the stack structure of the present invention, the bolts fastening and fixing the stacked fuel cells can be long bolts screwed into flanges sandwiching the stacked fuel cells on both sides or long bolts screwed into nuts. In addition, stud bolts can be used. The stud bolts can be used as positioning pins at stacking the fuel cells, and use of the stud bolts has an advantage of facilitating the stacking operation.

In the stack structure of the present invention, the central openings formed at the centers of the cell plate and the separator plate are configured to serve as any one of the gas introducing opening and the gas exhausting opening while the plurality of gas openings formed around the central openings are configured to serve as the other one of the gas introducing opening and the gas exhausting opening. In such a case, the stack structure can be configured so that a central ring along the vicinity of the edge of the central opening and an edge ring surrounding the plurality of gas openings serve as the sealing member. Alternatively, the stack structure can be configured so that a central ring along the vicinity of the edge of the central opening and a plurality of individual rings individually surrounding the plurality of gas openings serve as the sealing member. At this time, the shape of the plurality of gas openings formed around the central opening is not especially limited and can be polygonal, or fan-shaped as well as circular.

When the central ring and edge ring (or the individual rings) are made circular, the heat shock resistance can be increased. Moreover, since the shape of the plurality of gas openings formed around the central opening is not limited to a circular shape, dead space in the central section of each cell plate can be reduced. This can increase the effective power generation area of the cell plate and accordingly increase the output density. Moreover, the heat capacity is reduced, and the startability and the responsibility at the transient operation can be improved.

In the stack structure of the present invention, it is possible to employ a constitution including a plurality of bolts fastening and fixing the stacked fuel cells. In this case, thermal stress applied to each bolt can be made small, so that the heat resistance and heat shock resistance of the bolts can be increased.

In the stack structure of the present invention, the stacked fuel cells can be fastened and fixed by a plurality of bolts individually inserted through the plurality of gas openings formed around each of the central openings of the cell plate and the separator plate. In this case, the stacked fuel cells can be fastened and fixed without complicating the arrangement pattern of the sealing members. It is therefore possible to prevent deformation due to thermal stress applied to the bolts.

In addition, in the case where the stacked fuel cells are sandwiched by the flanges on both sides, it is possible to provide a structure in which elastic members interposed between the bolts and flanges for pressing in the stacking direction, such as disk springs, are not exposed to high temperature (a flange structure with a small thermal capacity). Accordingly, the heat shock resistance of the sealed part can be increased, and the startability and the responsibility at the transient operation can be improved.

In the stack structure of the present invention, the stacked fuel cells are fastened and fixed by a plurality of bolts individually inserted through a plurality of bolt holes which are provided around the central openings of the cell plate and the separator plate separately from the plurality of gas openings. In this case, the stacked fuel cells can be fastened and fixed by the plurality of bolts without complicating the arrangement pattern of the sealing members. It is accordingly possible to prevent deformation due to thermal stress applied to the bolts.

Furthermore, in the case where the stacked fuel cells are sandwiched by flanges on both sides, the heat shock resistance of the sealed part is increased, and the startability and responsibility at the transient operation can be improved.

In the stack structure, in the case where the stacked fuel cells are sandwiched by flanges on both sides, gas introducing and exhausting tubes can be attached to one of the flanges. This allows the flanges to have a gas heat exchange function, thus increasing the efficiency.

In the stack structure of the present invention, it is possible to employ a structure in which the stacked fuel cells are fastened and fixed by the single bolt inserted through the central openings of the cell plate and the separator plate. In this case, the heat capacity of the stack structure can be made smaller by that of bolts, and the startability and the responsibility at the transient operation can be improved.

Hereinafter, the present invention is described in more detail with embodiments but is not limited to the following embodiments.

FIGS. 1 to 4 show an embodiment of the stack structure of the present invention.

As shown in FIG. 1 and (a) of FIG. 2, a stack structure 11 includes a plurality of solid oxide fuel cells 1 stacked facing a same direction. The plurality of fuel cells 1 stacked are accommodated in a casing 12 and sandwiched by flanges 13 and 14 on both sides.

Figure 3:
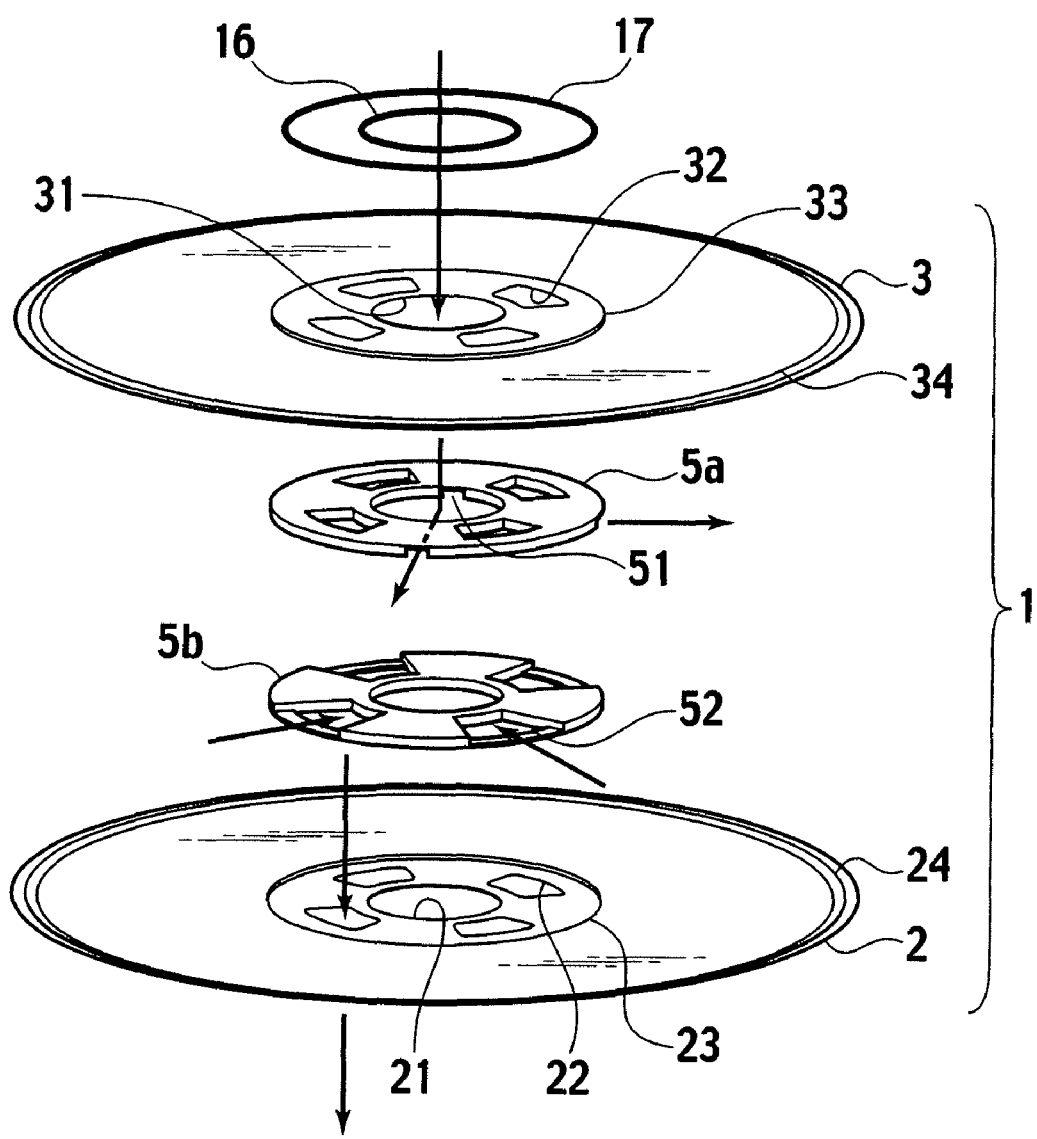
FIG. 3 is an exploded perspective view of the solid oxide fuel cell constituting the fuel cell stack structure in FIG. 1.

Each of the fuel cells 1 constituting the stack structure 11 includes a metallic cell plate 2 and a metallic separator plate 3 as shown in FIG. 3. The cell plate 2 and the separator plate 3 are circular and thin plate-shaped. Furthermore, the cell plate 2 includes a gas introducing opening 21 and a gas exhausting opening 22 in central section thereof. The separator plate 3 includes a gas introducing opening 31 and a gas exhausting opening 32 in central section thereof. As shown in (c) of FIG. 2, these cell and separator plates 2 and 3 are faced to each other with the outer peripheral edges joined to each other. Furthermore, a bag portion (space) S formed between the cell plate 2 and the separator plate 3 accommodates a collector 4. The collector 4 can be an electrically-conductive porous material. Examples thereof are metallic mesh, metal foam, and fabric or felt of fibers made of metal or an electrode material. The collector 4 can be joined to the cell plate 2 and the separator plate 3 at the peripheral edge thereof by laser welding.

As shown in (c) of FIG. 2, in the central sections of the cell plate 2 and the separator plate 3 joined facing to each other, circular protruding steps 23 and 33 are formed, respectively, which are concentric with the respective outer peripheral edges and are protruded apart from each other. The circular protruding steps 23 and 33 function as spacers as described later. The circular protruding steps 23 and 33 are individually formed by pressing in advance. In the outer peripheral edges of the cell plate 2 and the separator plate 3, annular steps 24 and 34 are respectively formed, which are concentric with the respective outer peripheral edges and protruded towards each other to form the space S. The annular steps 24 and 34 are individually formed by pressing in advance. The gas introducing openings 21 and 31 and gas exhausting openings 22 and 32 are disposed in the circular protruding steps 23 and 33 of the cell plate 2 and the separator plate 3, respectively.

Figure 4:
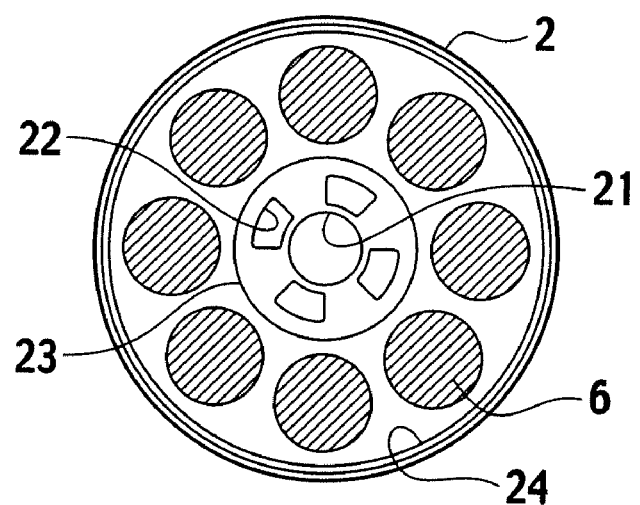
FIG. 4 is a plan view of a cell plate showing an arrangement pattern of single cells of the solid electrolyte fuel cell constituting the fuel cell stack structure of FIG. 1.

As shown in FIG. 4, in a doughnut-shaped area of each cell plate 2 between the central section and the outer peripheral edge thereof, a plurality of circular single cells 6 are fixed. Each of these single cells 6 may be an electrolyte supported cell, an electrode supported cell, or a porous substrate supported cell. Specifically, as the electrolyte supported cell, a cathode and an anode are provided on both sides of a solid electrolyte, so that the cathode and anode are supported by the solid electrolyte. As the electrode supported cell, the solid electrolyte and cathode are provided on the anode, so that the electrolyte and cathode are supported on the anode. As the porous substrate supported cell, the cathode, solid electrolyte, and anode are provided on a porous substrate, so that the cathode, solid electrolyte, and anode are supported on the porous substrate.

As shown in FIG. 3, the circular protruding step 33 of each separator plate 3 accommodates a channel member 5a, which is provided with gas introducing channels 51 communicating with the gas introducing opening 31 and supplies gas to the space S formed between the cell plate 2 and the separator plate 3. The circular protruding step 23 of each separator plate 2 accommodates a channel member 5b, which is provided with gas exhausting channels 52 communicating with the gas exhausting openings 22 and exhausts gas from the space S. These channel members 5a and 5b are brought into close contact to each other by only pressing force of the entire stack structure 11 in a state where the fuel cells 1 are stacked to form the stack structure 11.

In this embodiment, the cell plate 2 and the separator plate 3 were made of rolled plates of stainless steel SUS430 with a thickness of 0.1 mm. Each of such rolled plates is set in a pressing machine with a superhard mold of alloy steel SKD11 mounted thereon and is subjected to press working with a pressure of 80 ton. In the cell plate 2 and the separator plate 3 obtained by the press working, the outer diameter thereof was 125 mm; and step sizes of the circular protruding steps 23 and 33 and annular steps 24 and 34 were both 1 mm. The outer peripheral edges of the both separators 2 and 3 were joined by laser welding.

On the other hand, the channel members 5a and 5b were made of stainless steel SUS430 and were fixed to the cell plate 2 and the separator plate 3 by diffusion bonding at a bonding temperature of not more than 1000° C. in a vacuum to prevent deformation at bonding. In stead of the diffusion bonding, the joining may be performed by laser welding using YAG laser. Herein, since the cell plate 2 and the separator plate 3 are thin plates, the channel members 5a and 5b can be joined even by projecting laser beams onto a front side. Moreover, channel patterns of the channel members 5a and 5b are formed by etching, grinding, or laser processing and moreover can be formed by stacking and joining etched components.

The stack structure 11 in this embodiment is composed of the fuel cells 1 stacked with not-shown perforated collectors interposed therebetween, and an interspace between each adjacent pair of the fuel cells 1 overlapping each other is set as an air channel 15. In other words, a collector made of a porous material or the like is provided for each channel 15, and air is fed to the cathode of the single cells 6 through the collector.

In this case, the central openings formed at the respective centers of the cell plate 2 and the separator plate 3 are configured to be the gas introducing openings 21 and 31, and a plurality of gas openings formed around the central openings are configured to be the gas exhausting openings 21 and 31.

As shown in (a) and (b) of FIG. 2, central rings (sealing members) 16 are individually provided between the central sections of the fuel cells 11 near the edges of the central openings and allow the gas introducing openings 21 and 31 opposite to each other to airtightly communicate with each other. In addition, edge rings (sealing members) 17 are individually provided between the central sections of the fuel cells 1 around the plurality of gas openings. Each of the edge rings 17 surrounds the plurality of gas exhausting openings 22 and 32 opposite to each other and allows the same to airtightly communicate with each other.

The central rings 16 are formed into a ring shape by applying paste of a glass bonding material containing a ceramic filler to the vicinity of the edges of the central openings of the fuel cells 1 and stacking the fuel cells 1 on one another for pressure heating. On the other hand, each of the edge rings 17 is formed into a ring shape by applying paste of the glass bonding material containing the ceramic filler around the plurality of gas openings of the fuel cells 1 and stacking the fuel cells 1 on one another for pressure heating.

As shown in (a) and (b) of FIG. 2, the fuel cells 1 stacked with the central and edge rings 16 and 17 interposed therebetween are fixed by a plurality of stud bolts 18. In this embodiment, the plurality of stud bolts 18 are individually inserted through the plurality of gas exhausting openings 22 and 32 of the cell plate and the separator plate. One end of each of the stud bolts 18 is screwed into the flange 13. Furthermore, the other end of the stud bolt 18 protruding from the flange 14 to the outside is screwed with a nut 20 with a disk spring 19 interposed therebetween. The plurality of fuel cells 1 are thus fastened.

In this stack structure 11, as shown in FIGS. 1 and 2, when air is introduced into the casing 12, air flows between each adjacent pair of the fuel cells 1, that is, through each channel 15 on the cathode side. On the other hand, fuel gas is introduced through the flange 13 and the gas introducing openings 21 and 31 of the fuel cells 1 into the individual spaces S formed between the cell plate 2 and the separator plate 3. After flowing through the spaces S, the fuel gas is exhausted through the gas exhausting openings 22 and 32 and flange 14.

In the stack structure 11, the spaces S formed between the cell plate 2 and the separator plate 3 of the fuel cells 1 allow only fuel gas to flow therethrough, so that unburned gas can be recovered. Accordingly, even when the gas flow varies at the transient operation or the like, the fuel utilization is not reduced. Moreover, it is less likely to cause disadvantages due to thermal stress locally applied to the single cells 6.

Moreover, the central ring 16, which allows the gas introducing openings 21 and 31 of each adjacent pair of the fuel cells 1 which are opposite to each other to airtightly communicate with each other, and the edge ring 17, which surrounds the gas exhausting openings 22 and 32 and allows the same to airtightly communicate with each other, are individually provided between the central sections of the fuel cells 1. Accordingly, pressing force at fastening and fixing the stacked fuel cells 1 by the stud bolts 18 can be equally transmitted to the central sections of the fuel cells 1. Even when the central sections of the cell plate 2 and the separator plate 3 are made thin for low heat capacity, it becomes less likely to cause creep deformation at rise and fall of temperature, thus increasing the durability and the heat shock resistance.

Furthermore, in the stack structure 11, as shown in (b) of FIG. 2, the central and edge rings 16 and 17 as the sealing members are arranged in a double ring form. This eliminates the need to provide the sealing members separately around the gas introducing openings 21 and 31 or the gas exhausting openings 22 and 32. Accordingly, the sealing distance can be shortened, that is, installation area and length of the sealing members can be made small, and the gas sealability is hardly deteriorated even under the conditions where the stack temperature frequently changes at start and stop, at the transient operation, or the like. Moreover, there is less restriction in shape of the gas exhausting openings 22 and 32, which are provided for the individual central sections of the cell plate 2 and the separator plate 3, and the dead space in the central sections is accordingly reduced. Specifically, the proportion of the area occupied by the central section of each cell plate 2 to the entire cell plate 2 is reduced. Accordingly, the effective power generation area of each cell plate 2 is expanded, and the output density is thus increased.

Furthermore, in the stack structure 11, the stacked fuel cells 1 are fastened and fixed with the plurality of stud bolds 18 individually inserted through the plurality of gas exhausting openings 22 and 32, which are formed around the central openings of the cell plate 2 and the separator plate 3. It is therefore possible to prevent deformation due to thermal stress applied to the stud bolds 18. In addition, the stack structure 11 can be configured so that the disk spring 19 for pressing in the stacking direction is not exposed to high temperature. The heat shock resistance of the sealed part can be therefore increased, and the startability and the responsibility at the transient operation can be increased.

Figure 5:
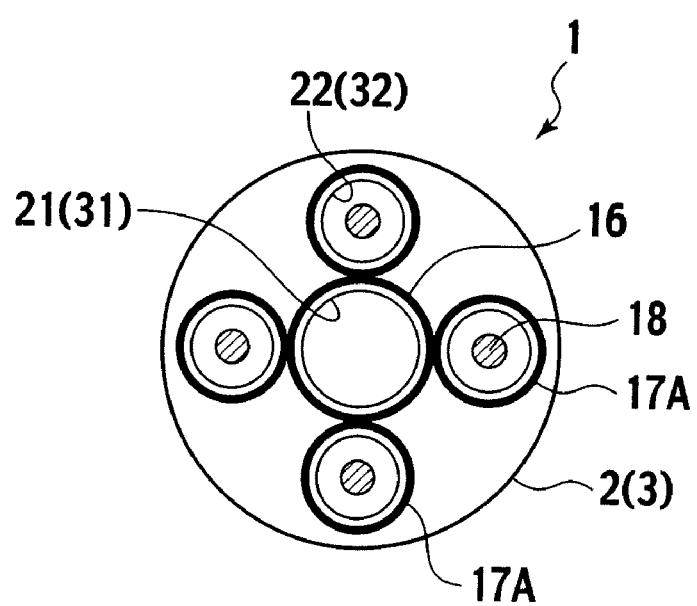
FIG. 5 is a transverse cross-sectional view of central section of the solid oxide fuel cell, showing another embodiment of the arrangement of a sealing member of the fuel cell stack structure of FIG. 1.

In the stack structure 11 of the embodiment, the sealing members are the central rings 16 along the vicinity of the edges of the gas introducing openings 21 and 31 and the edge rings 17 each surrounding the gas exhausting openings 22 and 32 together but not limited to this. For example, as shown in FIG. 5, the sealing members may be the central rings 16 along the vicinity of the edges of the gas introducing openings 21 and 31 and a plurality of individual rings 17A separately surrounding the plurality of gas exhausting openings 22 and 32.

Figure 6:
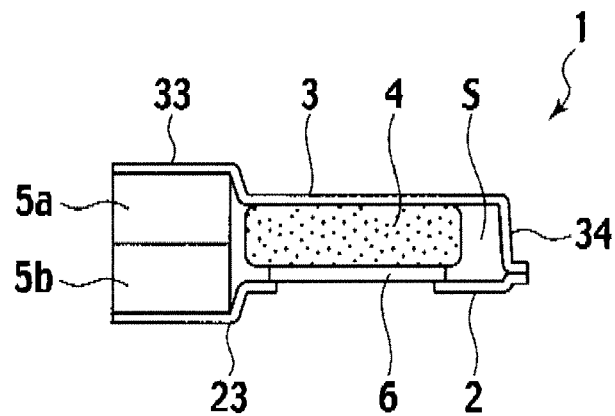
FIG. 6 is a partial longitudinal cross-sectional view showing another embodiment of the constitution of each solid oxide fuel cell constituting the fuel cell stack structure of FIG. 1.

In the fuel cells 1 of the stack structure 11 of this embodiment, the cell plate 2 and the separator plate 3 have a substantially same shape but not limited to this. For example as shown in FIG. 6, each of the cell plates 2, to which the single cells 6 are attached, may have a shape including only the circular protruding step 23, while each of the separator plates 3 has a shape including an annular step 34 substantially twice as high as usual.

Figure 7:
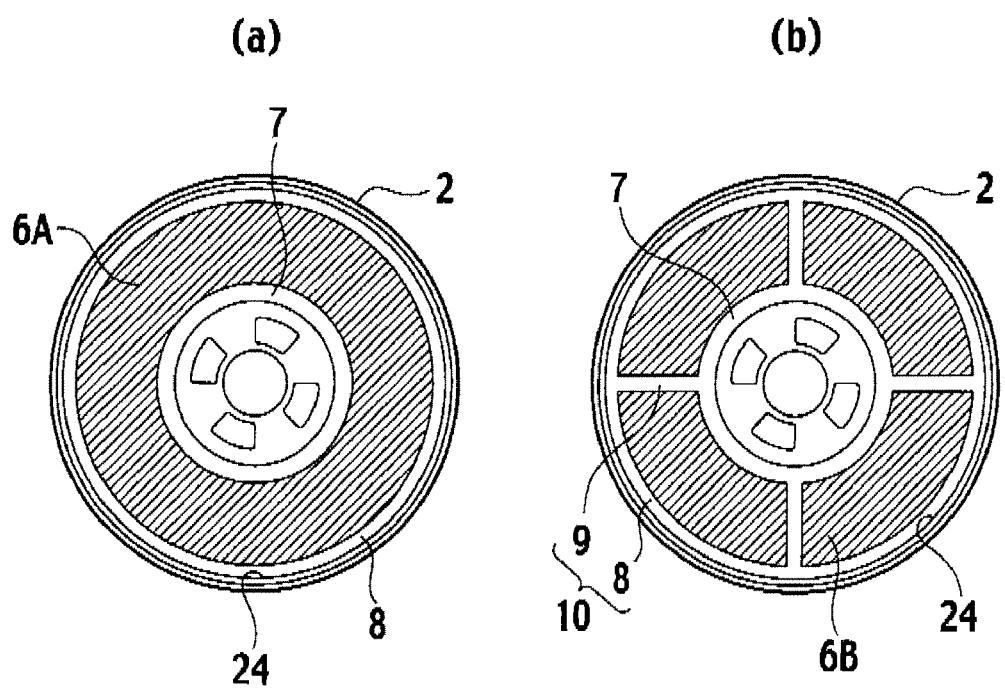
FIG. 7 includes plan views of the cell plate showing another arrangement pattern of single cells of the solid oxide fuel cell constituting the fuel cell stack structure of FIG. 1.

Furthermore, this embodiment shows a case where the single cells 6 have a disk shape with a small diameter but not limited to this. For example, as shown in (a) of FIG. 7, in the case where the fuel cells 11 include doughnut-shaped single cells 6A, inner and outer peripheral edges of each of the doughnut-shaped single cells 6A are respectively joined to the inner ring 7 and the outer ring 8, which are formed by press working in advance, and then the cell plate 2 and the separator plate 3 are joined to each other. At this time, in the light of the workability at joining, as shown in (b) of FIG. 7, the inner and outer rings 7 and 8 may be connected by transverse and longitudinal bridges 9 to form a frame 10, and fan-shaped single cells 6B may be attached to the frame 10.

In this embodiment, the central and edge rings 16 and 17 are formed by applying paste of the glass bonding material to the vicinities of the edges of the central openings of each fuel cell 1 and around the plurality of gas openings; and stacking the fuel cells 1 on each other for pressure heating, but the present invention is not limited to this. For example, the fuel cells 1 may be stacked on each other with ring-shaped and gasket-shaped sealing members being set on the individual central sections of the fuel cells 1; and joined to each other by pressure heating. Specifically, a gasket-shaped sealing member obtained by compressing fibers or powder of glass, ceramic, and metal are set in the central sections of the fuel cells 1. Thereafter, the plurality of fuel cells 1 are stacked on one another and then subjected to pressure heating to fuse the sealing members or hot compression.

The fuel cells 1 may be stacked on each other with a ring-shaped foil sealing member composed of a metallic brazing material being set in the central section of each fuel cell 1 and then pressed to be joined to each other. Moreover, sealing can be performed by pressing the fuel cells 1 at such a temperature that metal of the sealing members softens to fill uneven gaps between the central sections of the adjacent fuel cells 1.

FIG. 8 shows another embodiment of the stack structure of the present invention. As shown in (b) of FIG. 8, this stack structure 111 is different from the aforementioned stack structure 11 in that a plurality of bolt openings 26 and 36 are provided around the gas introducing openings 21 and 31 of the cell plate 2 and the separator plate 3 separately from the plurality of gas exhausting openings 22 and 32. The stacked fuel cells 1 are fastened and fixed by a plurality of bolts 118 inserted through the plurality of bolt openings 26 and 36. The other constitution of the stack structure 111 is the same as that of the aforementioned stack structure 11.

As shown in (a) of FIG. 8, in this embodiment, first the plurality of bolts 118 are individually inserted through the plurality of bolt openings 26 and 36, which are formed around the gas introducing openings 21 and 31 of the cell plate 2 and the separator plate 3. The top ends of the bolts 118 are screwed into a flange 114 with disk springs 119 interposed between heads of the bolts 118 and a flange 113 to fasten the plurality of fuel cells 1.

In this embodiment, in addition to the operational effects same as those of the stack structure 11, the stacked fuel cells 1 can be fastened and fixed by the plurality of bolts 118 without complicating the arrangement pattern of the sealing members. It is therefore possible to prevent deformation due to thermal stress applied to the bolts 118. Furthermore, the heat shock resistance of the sealing part can be increased, and the startability and the responsibility at the transient operation can be improved.

In the stack structure 111, the flange 113 of the flanges 113 and 114 sandwiching the stacked fuel cells 1 on both sides is provided with gas introducing and exhausting paths 113a and 113b. The flange 113 can therefore have the gas heat exchange function, thus increasing the efficiency.

FIG. 9 shows still another embodiment of the present invention. As shown in (b) of FIG. 9, this stack structure 211 is different from the aforementioned stack structure 11 in that the stacked fuel cells 1 are fastened and fixed with the single bolt 218 inserted through the gas introducing openings 21 and 31 of the cell plate 2 and the separator plate 3. The other constitution of the stack structure 211 is the same as that of the stack structure 11.

As shown in (a) of FIG. 9, in this embodiment, first the bolt 218 is inserted through the gas introducing openings 21 and 31 of the cell plate 2 and the separator plate 3. Thereafter, in the vicinity of a gas introducing opening in a flange 213, the top end of the bolt 218 is screwed into a flange 214 with a disk spring 219 being interposed between the head of a bolt 218 and flange 213. The plurality of fuel cells 1 are thus fastened by the bolt 218 alone.

This embodiment can also provide the same operational effect as that of the stack structure 11. In addition, the heat capacity can be reduced by that of bolts not used in this embodiment. Accordingly, the startability and the responsibility at the transient operation can be improved.

The entire contents of Japanese Patent Application No. 2005-314932 (filed on Oct. 28, 2005) and No. 2006-264443 (filed on Sep. 28, 2006) are herein incorporated by reference.

Hereinabove, the contents of the present invention are described along the embodiments and examples, but the present invention is not limited by these descriptions. It is obvious to those skilled in the art that various modifications and improvements can be made.

INDUSTRIAL APPLICABILITY

Since the fuel cell stack structure of the present invention employs the aforementioned constitutions, the gas sealability is hardly deteriorated to provide high reliability even under the conditions where the stack temperature frequently varies such as at the start and stop or at the transient operation. Furthermore, recovering unburned gas can avoid reduction in fuel utilization. Even if the cell plate and the separator plate are reduced in thickness for reduction in heat capacity, it is possible to prevent deformation by rise and fall of the temperature of the stack structure and therefore achieve an improvement in the heat shock resistance. Furthermore, the effective power generation area of the cell plates is increased, so that the output density can be increased.

The invention claimed is:

1. A fuel cell stack structure, comprising:
a plurality of solid oxide fuel cells, each of the solid oxide fuel cells comprising: a circular cell plate holding a single cell and having a gas introducing opening and a gas exhausting opening in central section thereof; a circular separator plate having the gas introducing opening and the gas exhausting opening in central section thereof and having an entire outer peripheral edge joined to an outer peripheral edge of the cell plate; and a central channel member which is located between the central sections of the cell plate and the separator plate to allow the gas introducing openings of the cell plate and the separator plate to communicate with each other and to allow the gas exhausting openings of the cell plate and the separator plate to communicate with each other, and supplies and exhausts any one of fuel gas and air to and from a space formed between the cell plate and the separator plate, the space being formed by providing at least any one of the cell plate and the separator plate with a step along the outer peripheral edge thereof;
sealing members interposed between each adjacent pair of the central sections of the stacked solid oxide fuel cells, the sealing members allowing the gas introducing openings opposite to each other to airtightly communicate with each other and allowing the gas exhausting openings opposite to each other to airtightly communicate with each other; and
a bolt penetrating through the central sections of the stacked solid oxide fuel cells,
wherein a plurality of the solid oxide fuel cells are stacked facing a same direction,
an interspace between each adjacent pair of the solid oxide fuel cells serves as a channel for only the other one of fuel gas and air, and
the solid oxide fuel cells stacked with the sealing members interposed therebetween are fastened and fixed by the bolt.

2. The fuel cell stack structure according to claim 1, wherein central openings formed at centers of the cell plate and the separator plate serve as any one of the gas introducing openings and the gas exhausting openings, and a plurality of gas openings provided around the respective central openings serve as the other one of the gas introducing openings and the gas exhausting openings, and the sealing members comprise a central ring along a vicinity of an edge of the central opening and an edge ring integrally surrounding a plurality of the gas openings.

3. The fuel cell stack structure according to claim 2, wherein the stacked solid oxide fuel cells are fastened and fixed by a plurality of the bolts inserted through a plurality of the gas openings.

4. The fuel cell stack structure according to claim 2, wherein the stacked solid oxide fuel cells are fastened and fixed by a plurality of the bolts individually inserted through a plurality of bolt openings which are provided around the central openings of the cell plate and the separator plate separately from the gas openings.

5. The fuel cell stack structure according to claim 2, wherein the stacked solid oxide fuel cells are fastened and fixed by the single bolt inserted through the central openings of the cell plate and the separator plate.

6. The fuel cell stack structure according to claim 1,
wherein central openings formed at centers of the cell plate and the separator plate serve as any one of the gas introducing openings and the gas exhausting openings, and a plurality of gas openings provided around the respective central openings serve as the other one of the gas introducing openings and the gas exhausting openings, and
the sealing members comprise a central ring along a vicinity of an edge of the central opening and a plurality of individual rings individually surrounding a plurality of the gas openings.

7. The fuel cell stack structure according to claim 1, wherein the sealing members have a function of joining each adjacent pair of the solid oxide fuel cells.

8. The fuel cell stack structure according to claim 1, further comprising:
a plurality of the bolts fastening and fixing the stacked solid oxide fuel cells.

9. The fuel cell stack structure according to claim 1, wherein the circular cell plate includes a protruding step which protrudes along a stacking direction of the fuel cell stack.

10. The fuel cell stack structure according to claim 9, wherein the protruding step is located in the central section of the circular cell plate.

* * * * *